US006993069B1

(12) United States Patent
Donati et al.

(10) Patent No.: US 6,993,069 B1
(45) Date of Patent: Jan. 31, 2006

(54) SIMULATION PROCESS OF RADIOFREQUENCY SCENARIO IN RADIO MOBILE ENVIRONMENT AND TESTING SYSTEM EMPLOYING SAID PROCESS

(75) Inventors: Marcello Donati, Milan (IT); Marco Politi, Milan (IT)

(73) Assignee: Siemens Information and Communication Networks, S.p.A., Milan (IT)

( * ) Notice: Subject to any disclaimer, the term of this patent is extended or adjusted under 35 U.S.C. 154(b) by 0 days.

(21) Appl. No.: 09/555,809

(22) PCT Filed: Nov. 26, 1998

(86) PCT No.: PCT/EP98/07762

§ 371 (c)(1),
(2), (4) Date: Jul. 28, 2000

(87) PCT Pub. No.: WO99/33202

PCT Pub. Date: Jul. 1, 1999

(30) Foreign Application Priority Data

Dec. 19, 1997 (IT) .............................. MI97A2826

(51) Int. Cl.
*H04B 17/00* (2006.01)
(52) U.S. Cl. .................................... 375/224
(58) Field of Classification Search ............... 375/224, 375/239, 261, 274, 336, 337, 279; 332/100, 332/103
See application file for complete search history.

(56) References Cited

U.S. PATENT DOCUMENTS

| 5,539,772 | A |   | 7/1996  | Fasulo, II et al. |
| 5,764,693 | A | * | 6/1998  | Taylor et al. ............... 375/222 |
| 5,852,651 | A | * | 12/1998 | Fischer et al. ............. 379/56.2 |
| 6,018,644 | A | * | 1/2000  | Minarik ....................... 455/82 |
| 6,025,758 | A | * | 2/2000  | Lu .............................. 332/100 |
| 6,185,259 | B1 | * | 2/2001 | Dent .......................... 375/261 |
| 6,373,827 | B1 | * | 4/2002 | Tayebi et al. ............... 370/310 |
| 6,483,880 | B2 | * | 11/2002 | Moriyama .................. 375/271 |

FOREIGN PATENT DOCUMENTS

| EP | A1878974  | 11/1998 |
| WO | A1-9933141 | 7/1999 |

OTHER PUBLICATIONS

Diouris et al., IEEE, vol. 1, No. 28, pp. 465-469 (1994).

* cited by examiner

Primary Examiner—Emmanuel Bayard
(74) Attorney, Agent, or Firm—Birch, Stewart, Kolasch & Birch, LLP

(57) ABSTRACT

A testing system includes simulation equipment for generating a radiofrequency test signal for the receivers of a base transceiver station, which is equipped with an intelligent array antenna having N sensors. The simulation equipment generates a complex signal consisting of N identical radiofrequency signals with differing phases. These signals are conveyed towards N antenna input connectors of the receivers to be tested. The N test signals are obtained by generating as many groups of N digital isofrequential carriers as are required to simulate the directions of a useful signal with an arbitrary number of echoes, and the directions of an arbitrary number of isofrequential interferent carriers. The N carriers of each group are appropriately modulated and digitally multiplied by the same number of relevant beamforming coefficients to produce, within each group, gradually increasing phase values.

21 Claims, 5 Drawing Sheets

Trama GSM n. 1

| Numero | Periferica di destinazione | tipo di canale | frequency hopping | livello RF | numero canale RF | direzione d'arrivo | tipo di fading | ritardo | Doppler spectrum type | velocità di MS |
|---|---|---|---|---|---|---|---|---|---|---|
| 1 | TX PROC#1 | portante utile | NO | -50 dBm | 126 | 60° | NO | 0 µs | . | 0 km/h |
| 2 | TX PROC#2 | eco utile | NO | -56 dBm | 126 | 62° | NO | 1 µs | . | 0 km/h |
| 3 | TX PROC#3 | interferente | SI | -60 dBm | 126 | 70° | NO | 56 µs | . | 0 km/h |
| ... | | | | | | | | | | |
| 16 | TX PROC#16 | eco Interferente | NO | -70 dBm | 127 | 55° | SI | 117 µs | CLASS | 50 km/h |

Tab 1

Trama GSM n. 2

| Numero | Periferica di destinazione | tipo di canale | frequency hopping | livello RF | numero canale RF | direzione d'arrivo | tipo di fading | ritardo | Doppler spectrum type | velocità di MS |
|---|---|---|---|---|---|---|---|---|---|---|
| 1 | TX PROC#1 | portante utile | NO | -49 dBm | 126 | 61° | NO | 0 µs | . | 0 km/h |
| 2 | TX PROC#2 | eco utile | NO | -58 dBm | 126 | 63° | NO | 1 µs | . | 0 km/h |
| 3 | TX PROC#3 | interferente | SI | -60 dBm | 103 | 70° | NO | 56 µs | . | 0 km/h |
| ... | | | | | | | | | | |
| 16 | TX PROC#16 | eco Interferente | NO | -60 dBm | 127 | 54° | SI | 117 µs | CLASS | 50 km/h |

Tab 2

Trama GSM n. k

Tab. k

Fig. 7

SIMULATION PROCESS OF RADIOFREQUENCY SCENARIO IN RADIO MOBILE ENVIRONMENT AND TESTING SYSTEM EMPLOYING SAID PROCESS

This application is the national phase under 35 U.S.C. § 371 of PCT International Application No. PCT/EP98/07762 which has an International filing date of Nov. 26, 1998, which designated the United States of America.

FIELD OF THE INVENTION

The present invention relates to the field of test systems for telecommunication equipment and more in particular to a radiofrequency scenario simulation process in mobile radio environment for the testing of receivers of base transceiver stations with intelligent antennas, and testing system employing said process.

Before introducing the art known in the field of the invention, it is necessary to briefly describe the operation and problems related to the use of the so-called "intelligent" antennas; to justify, in the applicant's opinion, the lack of testing systems oriented to such a kind of antennas.

As it is already known, the use of intelligent antennas commences in the mobile radio environment to render the reutilization of the same carrier frequencies in cells of adjacent clusters less critical. This critical character is particularly evident in high traffic urban environment, where reutilization distances can suffer a considerable reduction due to the reduced dimensions of the cells, often of some hundreds of meters only. The use of traditional omnidirectional antennas, or of trisectorial ones, involves high interference problems in these particular environments by isofrequential signals coming from adjacent clusters. This is due to the scarce directivity of the antennas, which consequently involves the transmission of comparatively high power signals by the base transceiver stations (BTS). On the contrary, the intelligent array antenna, is a directive radiant system, able to concentrate the electromagnetic field in the original estimated direction of the signal transmitted by a generic mobile MS (in all the directions of the azimuth plane), separately for all the mobiles of a cell where the antenna is allocated. The antenna is therefore characterized by dynamic radiation diagrams (as many as are the time division carriers assigned to the BTS multiplied by the number of time slots) fit with main lobes of reduced angular opening that follow up the directions of the relevant mobiles, thus avoiding to vainly leak power out of these directions. Reciprocally in reception, this involves a reduction of the total level of isofrequential interferents and, consequently, of the reutilization distance of the same carriers, and therefore of the dimensions of clusters.

It is also known that the intelligent antennas are based on the use of electromagnetic field sensor arrays, each sensor being connected to its own transceiver, and the whole of transceivers to a process module able to duly process the signals received, or transmitted, by the single sensors. Usually, the receiver acts as "master", that is, it estimates on the azimuth plane the arrival directions of signals of the mobiles in transit in its cell and communicates this information to the transmitter that synthesises the angular openings of the antennas in the above mentioned angular directions, supplying the single sensors with replicas of a same signal, duly phase shifted among them.

While for the transmitter associated to an intelligent array antenna there is no particular realization problem, the same is not true for the implementation of the similar receiver, since the estimate of the arrival directions of useful signals is a complex operation from the computation point of view. It requires in fact an opportune processing of the module and phase information of more replicas of the radio signal received by the different sensors of the array. Said complexity derives from the fact to distinguish in the signal transduced from the array, the directions of the useful signals from those of relevant interferent signals, that is the isofrequential signals emitted by mobiles transiting in adjacent cluster cells, and the echoes due to the multiple reflections of the useful by obstacles spread over the territory, whose extent and time delay depend on the geographic environment of the cell (urban, suburban, rural environment). This information on the arrival directions is then used by the receiver to perform a spatial filtering of the N signals transduced by the array, in order to filter the useful from the different interferents.

BACKGROUND ART

In the examples of base transceiver stations with intelligent antennas according to the known art, a similar discrimination of the useful from the interferents is only partially made. This does not happen for a newly conceived base transceiver station, implemented by the same applicant, whose main innovative aspects have been protected by the following relevant patent applications:

EP 0 878 974 under the title "Communication Method for cellular telephone systems", filed on May 16, 1997;

WO 99/33141 under the title "Discrimination process of a useful signal by a plurality of isofrequential interferent signals received by array antennas of base transceiver stations for cellular telecommunication and relevant method".

In particular, the last mentioned application solves the problem of discrimination of the useful signal from a plurality of isofrequential interferents through a spatial filtering method, or beamforming, made on signals transduced by the array, previously submitted to a processing determining the number and the arrival directions of the waves incising on the array, distinguishing the useful from the relevant interferents.

Therefore, it is evident that in testing systems of base transceiver stations equipped with intelligent antenna, of old conception, the problem to simulate a radiofrequency scenario reflecting as precisely as possible what actually occurs in the reality, is not particularly perceived. This is a consequence of the fact that the beamforming algorithms there used do not discriminate (or do it in a rough and predictable manner) the useful signals from the relevant interferent echoes. It is then possible, and in the practice it generally occurs in the context of the known art, to use the old test equipment for receiver apparatus of the base transceiver stations, with omnidirectional or trisectorial antennas, apart from the simulation of the arrival directions of useful and relevant interfering echoes. Consequently, the actual test of the behaviour of the receiver complete with intelligent array antenna requires opportune test transmitters located, ad hoc, on the territory.

U.S. Pat. No. 5,539,772 is an example of a test equipment designed for verifies the performance of a digital satellite receiver belonging to a mobile terminal unit. As known, a geostationary satellite retransmits towards the mobile a phone call received from a satellite ground station, in turn connected to a public telephone network. The relevant claim 1 of the citation discloses an Apparatus for verifying performance of a RF receiver, comprising:
arbitrary waveform generator means for outputting an analog in-phase waveform and an analog quadrature waveform in accordance with sampled digital waveform data, said arbitrary waveform generator means including parallel first and second First-In-First-Out random access memories for storing the sampled digital waveform data;
the sampled digital waveform data comprising an in-phase waveform file stored in said First-In-First-Out memory and a quadrature waveform file stored in said second First-In-First-Out memory
each of the in-phase and quadrature waveform files including 60% root-cosine differential quadrature phase shift keyed data corresponding to successive frames of primary transmission channel data, co-channel interference data, adjacent channel interference data, and data relating to at least one of a plurality of impairments;
unity gain reconstruction filter means, connected to said arbitrary waveform generator means, for smoothing the analog in-phase and quadrature waveforms
vector signal generator means, responsive to the filtered analog in-phase and quadrature waveforms, for outputting a modulated RF signal; and
means for coupling an input of the RF receiver to the modulated RF signal output from said vector signal generator.

A further independent claim of the same cited prior art is directed to a method for testing the receiver. In accordance with the claimed method a digital frame including a portion dedicated to reproduce the signal transmitted, via satellite, to a mobile telephone unit is generated. Except for the framed digital signal, the claimed method has the substantial features of the claimed apparatus. In the supporting description all the means involved in claim 1 generates a narrow band test signal, which because a mobile telephone unit activates only a telephone call at a time, contrarily to the base station which activates a plurality of simultaneous calls. Accordingly, the signal generated by the test apparatus of the citation is unsuitable to test a base station, where a suitable test signal should be of the multicarrier type. In the particular case of GSM with beamforming, a minimal realistic test apparatus is charged to synthesize a useful signal freely displaceable inside a wide radiofrequency band, i.e. the 880–915 MHz for extended GSM, plus one or more co-channel interferent having a presettable direction out of 360°. A more versatile apparatus could generate several sets of similar signals at the various frequencies. No suggestion is given in the citation about the design of such a test apparatus.

SUMMARY OF THE INVENTION

A general object of the present invention is to propose a simulation process of radiofrequency scenario for the testing of radio receivers with intelligent array antenna, able to identify the direction of a useful signal from those of isofrequential interferents, irrespective of the fact that a spatial filtering is then made.

Elective object of the present invention is that to overcome the drawbacks of testing systems for receivers of base transceiver stations of cellular telephone systems of old design, and to propose a radiofrequency scenario simulation process in mobile radio environment for the testing of radio receivers of base transceiver stations with intelligent antennas, of new generation, as much realistic as possible, for the whole typology of signals which can incise on the antenna, that is: the useful signals emitted by several mobiles, the relevant echoes due to multiple reflections, the isofrequential interferents due to the reutilization of the carriers, the echoes of said interferents, the interferents from adjacent channel, the echoes of said interferents.

a) To attain these objects, scope of the present invention is a simulation process of radiofrequency scenario, in particular for the testing of receivers for N sensor intelligent array antennas, as described in claim 1.

Profitably, the subject process can be used for the simulation of a radiofrequency scenario of any cellular telephone system, characterized by the reutilization of carriers. The simulated scenario can be tailored in the way time by time considered more adequate to a particular testing requirement.

According to another aspect of the invention, the simulated scenario has dynamic characteristics, obtained varying at pre-set time intervals the setting of parameters relevant to characteristic magnitudes of useful and interferent carriers contained in said tables, which define the simulated scenario, such as for instance: level, delay, arrival direction, etc., the duration of said intervals being rather short to be comparable to the time slot employed by similar variations when occurring in a real scenario, but however sufficient to the reprogramming of the different phases of the simulated scenario.

Profitably, the simulation of the scenario includes the presence of noise, the doppler effect due to the speed of mobiles and the quick and sudden fadings of the electromagnetic field received, caused by destructive interference from multiple paths (fading of Rayleigh) or masking by obstacles of different nature encountered by the mobiles.

Since the intelligence of the receivers of a base station for mobile radio systems with intelligent antenna of new generation has the characteristics mentioned above, it results that the testing of these intelligent characteristics requires an adequate stimulation by the testing system, which shall be able to reproduce a radiofrequency scenario so richly diversified.

Therefore, further object of the invention is a testing system of receivers of a base station per mobile radio systems with intelligent array antenna, of new generation, employing the scenario simulation process scope of the present invention, as described in claim 11.

The great advantage that a similar system has, is to enable a complete and accurate testing of the receivers of the above mentioned base station, without the need of preparing sample transmitters on the territory. The system is also characterized by an exceptional flexibility in preparing the scenario considered time by time more suitable to the verification of the receiver performance compared to a particular specification standard. In fact, it is sufficient that the testing operator fills in a limited number of tables describing the scenario to simulate, afterwards, simply clicking with the mouse the same become operative in real time.

BRIEF DESCRIPTION OF DRAWINGS

The invention, together with further objects and advantages thereof, may be understood making reference to the following detailed description, taken in conjunction with the accompanying drawings, in which:

FIG. 7 shows the tables previously stored in the permanent storage of the processor of FIG. 1, available to the testing operator for the setting of the parameters distinguishing a scenario to be simulated.

DETAILED DESCRIPTION

Figure 1:
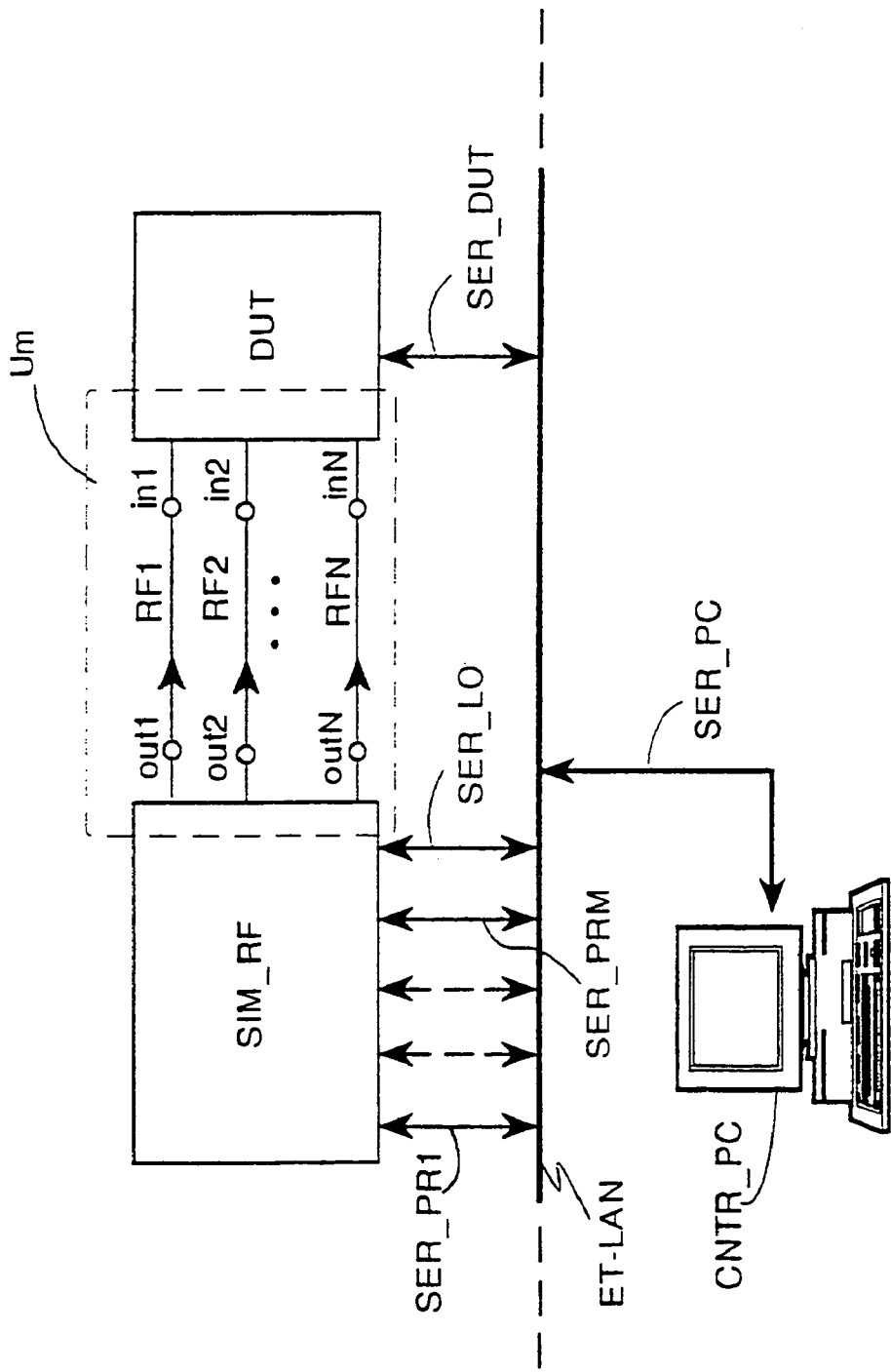
FIG. 1 shows a quite general block diagram of the testing system scope of the present invention, connected to a device to be tested (D.U.T.)

Making reference to FIG. 1, it can be noticed a testing system of a device DUT (Device Under Test) consisting of a simulation equipment SIM_RF connected to a control processor CNTR_PC through a serial bus ET_LAN of a local network, for instance of the Ethernet type, to which also the DUT device is connected.

The SIM_RF block has N radiofrequency outputs out1, out,2, . . . , outN connected, through N coaxial cables, to a same number of inputs in1, in2, . . . , in N of the DUT block. Relevant radiofrequency signals RF1, RF2, . . . , RFN coming out from the SIM_RF block run along said cables, and enter the DUT block. Blocks SIM_RF and DUT, as well as the personal computer CNTR_PC, are connected to the serial bus ET_LAN. More in particular, the personal computer CNTR_PC is connected to the ET_LAN bus through its own serial bus SER_PC, the DUT block through a serial bus SER_DUT, and block SIM_RF through M serial buses SER_PR1, SER_PR2, . . . , SER_PRM and a M+1-th serial bus SER_LO.

In operation, the SIM_RF block is a simulation equipment governed by the personal computer CNTR_PC, and the DUT block is a receiver of a base transceiver station (BTS) for cellular telephone system of the FDMA/TDMA type, for instance GSM 900 MHz, or DCS 1800 MHz. The whole of the RF1, . . . , RFN signals conforms to the selected standard that defines the radio interface. Even if not shown in the figure, the above mentioned blocks include one or more interface devices towards the local network ET_LAN.

Observing the testing configuration of the figure (test bed), we can perceive the great advantage offered by the connection in local network both of the testing system CNTR_PC, SIM_RF and of the device to test DUT. In fact, this last could send the results of the different tests directly to the computer CNTR_PC, in a completely asynchronous mode versus the flow of testing data. The control processor will avail of evaluation procedures and print of the results, and in the case of variation of input stimulations. In this way the testing will result completely automated.

Figure 2:
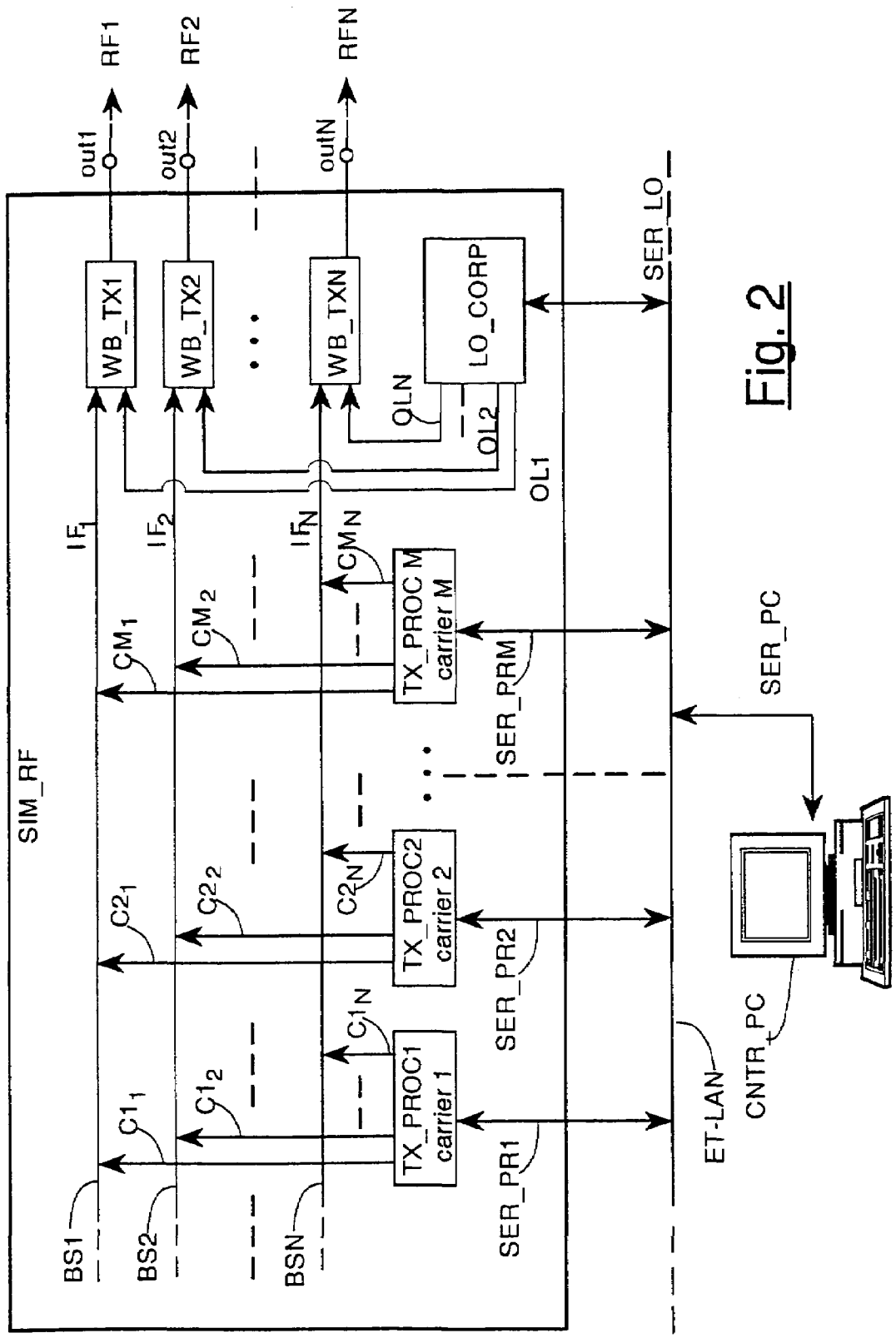
FIG. 2 shows more in detail a SIM_RF block of FIG. 1 belonging to the above mentioned testing system.

Making reference to FIG. 2, we notice that the simulation equipment SIM_RF includes M processor modules TX_PROC1, TX_PROC2, . . . , TX_PROCM; N broad band radiofrequency transmitters WB_TX1, WB_TX2, . . . , WB_TXN; and a LO_CORP block generating N identical signals of local oscillator OL, reaching the transmitters WB_TX1, . . . , WB_TXN.

Each TX_PROC block has N outputs for a same number of digital sequential words $Cx_y$ reaching the relevant N parallel buses BS1, BS2, . . . , BSN, where the value of index x indicates the origin from a relevant processor module m-th, while the value of index y indicates the n-th bus reached by the signal $Cx_y$. I bus BS1, BS2, . . . , BSN are connected to an input of relevant broad band transmitters WB_TX1, WB_TX2, . . . , WB_TXN identified by the same ordinal number.

In the operation, the architecture of the SIM_RF equipment shows a modularity per time division radio carrier, with a maximum of M carriers generated by M modules TX_PROC, and per antenna element, with a maximum of N elements (virtual), supplied by a same number of signals coming out from the WB_TX transmitters. Each module TX_PROC generates also the N-1 replicas of its own carrier, duly phase shifted, necessary to control the modularity per antenna element (virtual).

The processor modules TX_PROC perform the following operations, in a completely digital manner:

acquisition of control signals by the processor CNTR_PC, as serial messages withdrawn from the bus ET_LAN;

generation of P numeric isofrequential carriers and GMSK modulation of the same using an identical modulating signal, obtaining components in phase I and in quadrature Q of each carrier;

multiplication of the samples of said components I and Q by relevant complex constants coming from CNTR_PC, originating "weighed" components in phase and module in order to realize beamforming, as we shall see below;

vectorial sum of I and Q "weighed" components of each carrier, obtaining in change digital modulated carriers GMSK;

level control of the above mentioned modulated carriers in steps of programmable amplitude;

control of the ramp-up and ramp-down time of the envelope of the modulated signal, at the beginning and at the end of each burst, respectively (ramp-up and ramp-down functions);

numeric conversion at intermediate frequency of each modulated carrier, obtaining said digital words $Cx_y$;

construction of N transmission digital signals of the multi-carrier type at intermediate frequency, identified IF1, IF2, . . . , IFN, respectively, coinciding with the buses BS1, BS2, . . . , BSN, through sum of each m-th word $Cx_y$ identified by the same index y.

Signals IF1, IF2, . . . , IFN reaching the N broad band transmitters WB_TX1, WB_TX2, . . . , WB_TXN, are converted to analogue by the same, typically compensating the distortion of the senx/x type, broad band filtered, and then converted at radiofrequency in test signals RF1, RF2, . . . , RFN placed in a selected transmission sub-band. The N signals RF1, RF2, . . . , RFN, thanks to the beam-forming, are suitable to simulate up to M different arrival directions from a unique spatial point. The same directions are in fact recognized by the receiver DUT per intelligent antenna of a BTS in testing phase, and therefore without antenna, on the basis of the reciprocal phase shifting existing between the N carriers of each of the M groups of N isofrequential carriers forming the N broad band signals RF1, RF2, . . . , RFN, globally conveyed in the DUT block by a same number of coaxial cables.

Figure 3:
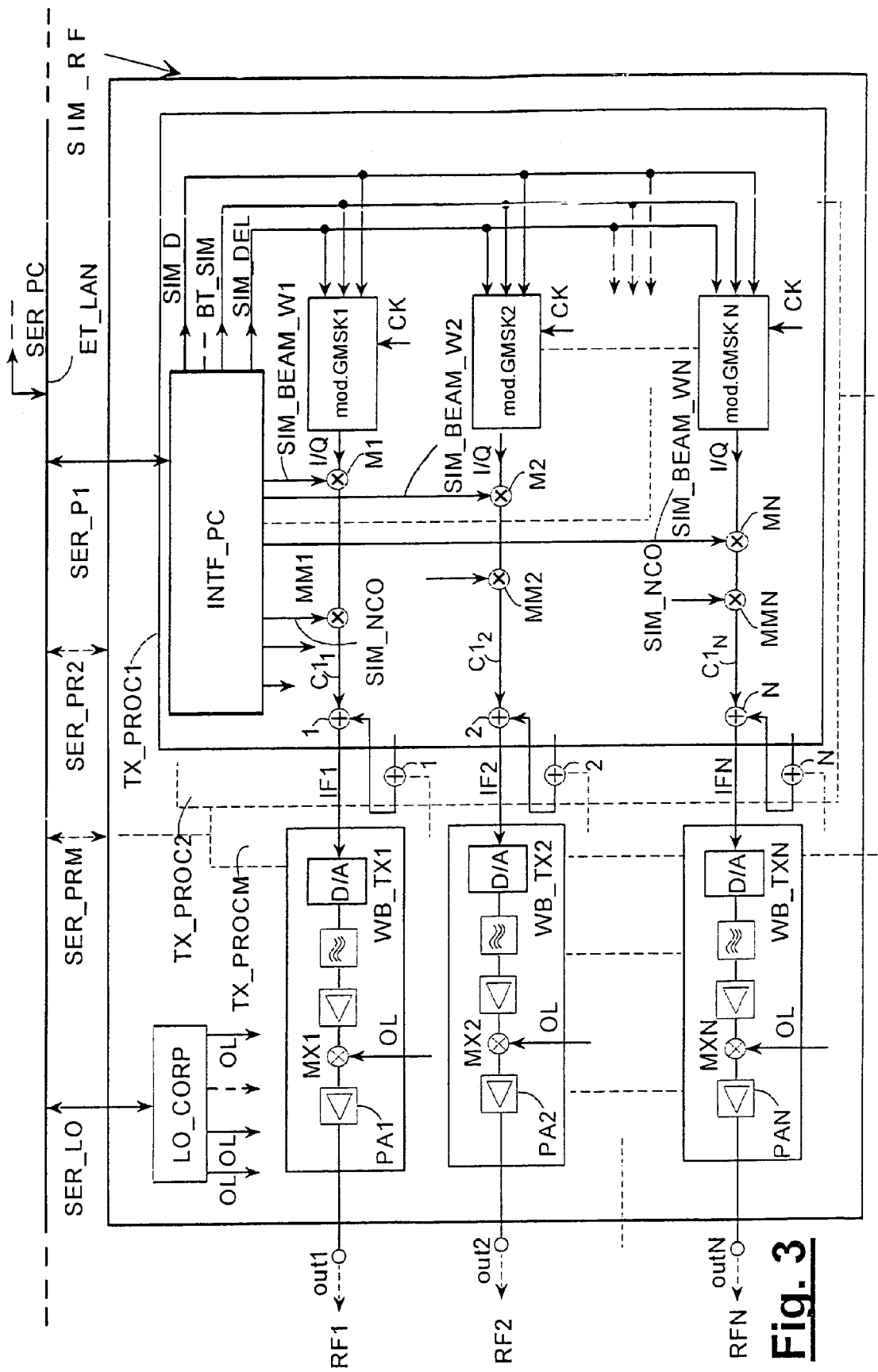
FIG. 3 shows the SIM_RF block of FIG. 2 with higher detail, up to the indication of the single circuit blocks.

FIG. 3 highlights with higher circuit detail what already said in the comment of FIG. 2; in particular it is supplied the architecture of processor modules TX_PROC and of transmitters WB_TX.

Making reference to FIG. 3, in which the same elements of the previous figures are indicated with the same symbols, we notice the processor modules TX_PROC1, TX_PROC2, . . . , TX_PROCM of which, only for module TX_PROC1, the internal architecture is highlighted, being the architecture of the remaining modules identical to the highlighted one. The TX_PROC1 module includes N modulators GMSK1, GMSK2, . . . , GMSKN and a INTF_PC block connected, through the serial bus SER_PR1, to the serial bus ET_LAN of the local network to which all the remaining blocks TX_PROC are abutted, the LO_CORP block, as well as the personal computer CNTR_PC and the DUT block highlighted in the testing configuration (test bed) of FIG. 1. At output of the INTF_PC block, digital signals are present, indicated as follows:

SIM_D, BT_SIM, and SIM_DEL directed towards all the GMSK modulators;

N complex data SIM_BEAM_W1, SIM_BEAM_W2, . . . , SIM_BEAM_WN addressed towards an input of relevant first complex digital multipliers M1, M2, . . . , MN, the other input of which is reached by the components I and Q coming out from relevant GMSK modulators; and finally N identical digital carriers SIM_NCO addressed towards an input of relevant second digital multipliers MM1, MM2, . . . , MMN, the other input of which is reached by the signals coming out from relevant first multipliers M1, M2, . . . , MN (through the adders of the "weighed" I and Q components, omitted for briefness sake in the figure).

One clock input of GMSK modulators is reached also by a signal CK, used for the generation of relevant and identical digital carriers in base band.

At the output of the second multipliers MM1, MM2, . . . , MMN the N signals $C1_1$, $C1_2$, . . . , $C1_N$ of FIG. 2 are present; these last reach a first input of relevant N digital adders 1, 2, . . . , N, having two inputs, also included in the TX_PROC1 block. The second input of said adders is reached by relevant sum signals of corresponding signals $Cx_y$ generated by the remaining modules TX_PROC of the block SIM_RF. As it can be noticed in the figure, TX_PROC blocks are placed in cascade as for the adders 1 . . . N, that is the output of a generic adder of a block reaches an input of the corresponding adder of a block placed downstream. Consequently, adders 1, 2, . . . , N of the TX_PROC1 block, placed downstream the whole chain of blocks TX_PROC, obtain at output the digital signals at intermediate frequency IF1, IF2, . . . , IFN, as cumulative sum of relevant signals $Cx_y$ corresponding to those indicated on buses BS1, BS2, . . . , BSN of FIG. 2. It results that the implementation of these last is actually obtained through the M groups of adders 1, 2, . . . , N placed in cascade.

The N digital signals at intermediate frequency IF1, IF2, . . . , IFN reach a same number of digital/analogue converters included in the relevant blocks $WB\_TX_1$, WB_TX2, . . . , WB_TXN. Converted signals are duly broad band filtered, amplified, and sent to a first input of relevant mixers MX1, MX2, . . . , MXN, reached also by the N identical signals of local oscillator OL coming from LO_CORP, obtaining at output N radiofrequency signals. These last are duly filtered and sent to relevant power amplifiers PA1, PA2, . . . , PAN, obtaining the N signals RF1, RF2, . . . , RFN present at the outputs out1, out2, . . . , outN of SIM_RF.

All what said up to now concerning the operation of the SIM_RF equipment of FIGS. 2 and 3 relates to what happens in a single time slot. This time (577 µs) is too short to complete the dialogue between CNTR_PC and SIM_RF and the required programming of modulators GMSK by the INTF_PC block; consequently the settings of the SIM_RF equipment, for all the time slot of the present frame possibly involved, shall be made during a frame time (4,61 ms) and shall become operative during the subsequent GSM frame.

Continuing the description of the operation of the simulation equipment SIM_RF, it is impossible to leave out of consideration the dialogue between this last and the control personal computer CNTR_PC. Before describing the methods of such a dialogue it is useful to give some theoretical clarifications on the beamforming, used in the present invention to simulate the arrival direction of useful and interferents.

Figure 4:
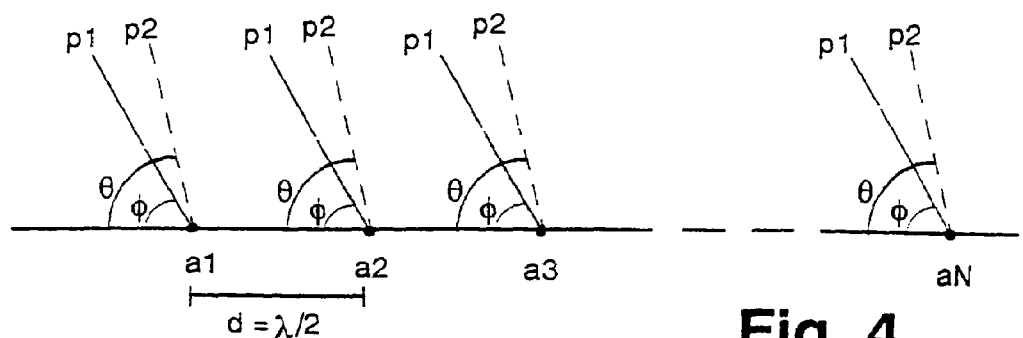
FIG. 4 gives a representation of the directions of plane waves incising on an array antenna, usually employed during the actual operation by the device to be tested (DUT) of FIG. 1.

Making reference to FIG. 4, we notice an array antenna, seen from the top, consisting of N sensors a1, a2, a3, . . . , aN aligned along a straight line and separated one from the other of a distance d=λ/2, at centreband frequency of the band assigned by the particular transmission standard valid for the type of BTS to be tested. The antenna has a plane form, whose trace on the figure plane corresponds to the sensors junction line. The antenna plane is stricken by two plane waves p1 and p2 coming from two different directions, indicated with two straight lines, perpendicular to the relevant wave fronts and forming two relevant arrival angles φ and θ with the trace of the antenna plane.

Figure 5:
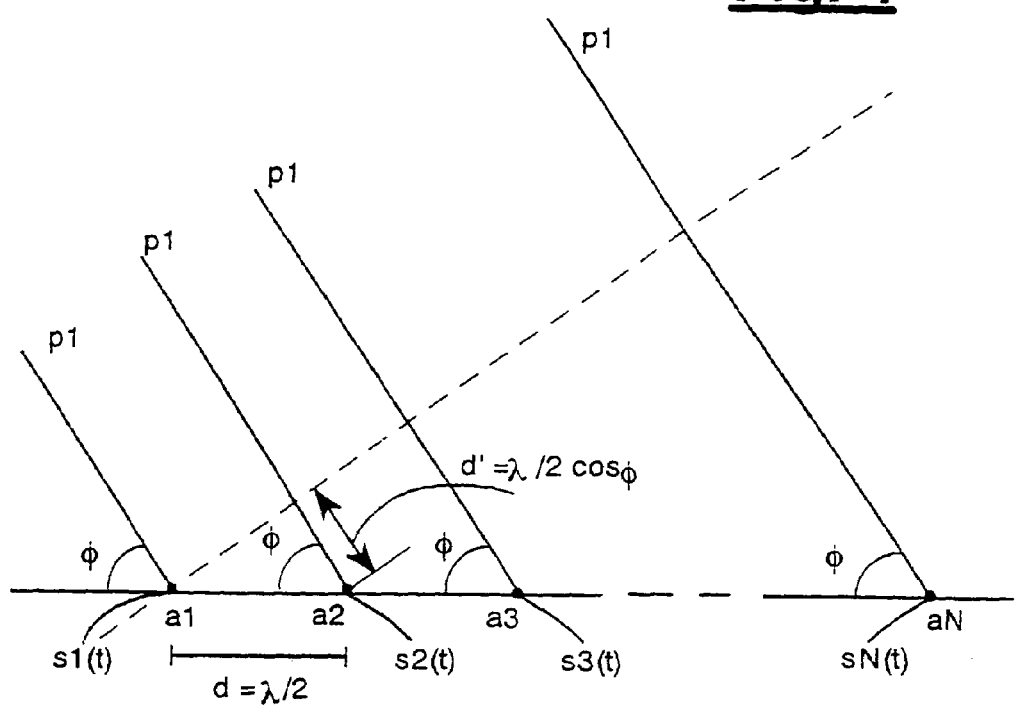
FIG. 5 shows the progressive phase shifting existing among the components of a plane wave front coming from a direction ϕ of FIG. 4, on the moment the same incises on the sensors of the array.

Making reference to FIG. 5, we notice the wave front p1 on the moment it strikes the sensor a1 placed at one end of the array. From the figure it is clear that the subsequent sensors shall be stricken with ever increasing delays, consequently the modulated carrier corresponding to the plane wave p1 shall be seen at the input of the different sensors of the array like N identical modulated carriers s1(t), s2(t), . . . , sN(t), phase shifted among them by ever increasing angles. All these phase shiftings are therefore in biunivocal relation with the arrival direction of p1, so that to estimate the unknown arrival direction of a generic carrier coming from a mobile, it is sufficient to measure the reciprocal phase shiftings among the signals received from single sensors, taking an ending one to determine an absolute phase reference. This is just what the block DUT performs in its actual operation. Concerning the simulation equipment SIM_RF, the dual reasoning applies, that is, starting from a direction to simulate of a test carrier, it is necessary to calculate some complex constants (beamforming coefficients) which, multiplied by N identical modulated carriers p1 give the reciprocal phase shiftings identical to those of the wave front of FIG. 5. It is then clear that sending this set of carriers directly downstream the array, excluding this last, we obtain the same effect as that obtained sending a carrier from a direction φ with inserted antenna. The reasoning made for the carrier p1, whose arrival direction has to be simulated, applies to any other carrier, both useful or interferent, whose directions must be simulated them too. It is this possible to test from a unique spatial point, the laboratory one, through a simulated scenario, the characteristics of the receiver defining the intelligent behaviour of the same.

Figure 6:
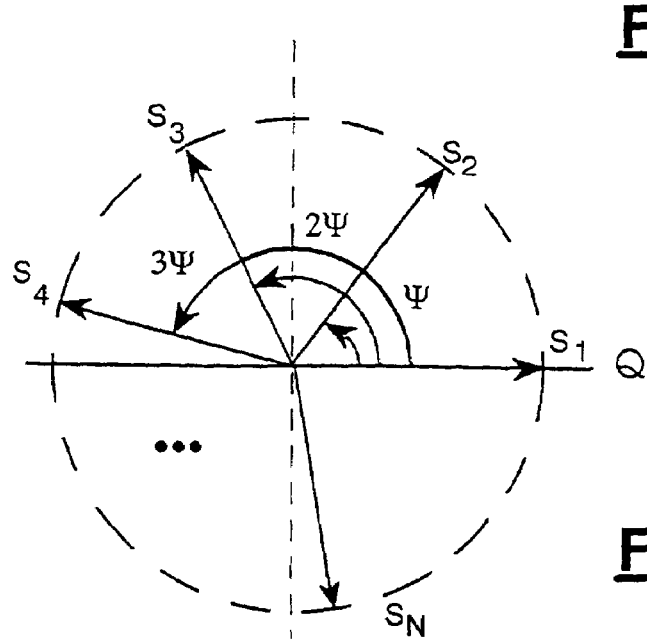
FIG. 6 shows a picture on the complex I/Q plane of the rotating vectors that represent the components of the plane wave front of FIG. 5.

Referring to FIGS. 5 and 6, it is now described the calculation of beamforming coefficients enabling to obtain the set of phase shifted carriers as desired. To this purpose, it is used in FIG. 6 a vectorial representation on plane 1, Q of the modulated carriers s1(t), s2(t), . . . , sN(t) of FIG. 5 present at the input of the single sensors a1, a2, a3, . . . , aN, indicating the corresponding rotating vectors con $S_1$, $S_2$, $S_3$, . . . , $S_N$. The phase absolute reference is selected arbitrarily assuming equal to zero the phase of vector $S_1$.

Indicating the vectors in exponential form with module A, and letting $\Psi=\pi \cos \phi$, the following representation applies:

$$S_1 = Ae^{j0}$$

$$S_2 = Ae^{j\frac{2\pi}{\lambda}d\cos\varphi} = Ae^{j\pi\cos\varphi} = Ae^{j\Psi}$$

$$S_3 = Ae^{j\frac{2\pi}{\lambda}d\cos\varphi} = Ae^{j2\pi\cos\varphi} = Ae^{j2\Psi}$$

$$S_N = Ae^{j\frac{2\pi}{\lambda}(N-1)d\cos\varphi} = Ae^{j(N-1)\pi\cos\varphi} = Ae^{j(N-1)\Psi}$$

The calculation of the Cartesian components of each vector is now immediate, according to the known trigonometric relations:

$Q_1 = A$ $I_1 = 0$ $Q_2 = A\cos(\Psi) = A\cos(\pi\cos\phi)$ $I_2 = A\sin(\Psi) = A\sin(\pi\cos\phi)$ $Q_3 = A\cos(2\Psi) = A\cos(2\pi\cos\phi)$ $I_3 = A\sin(2\Psi) = A\sin(2\pi\cos\phi)$ $Q_N = A\cos((N-1)\Psi) = A\cos((N-1)\pi\cos\phi)$ $I_N = A\sin((N-1)\Psi) = A\sin((N-1)\pi\cos\phi)$ The N pairs of values I and Q so obtained correspond to beamforming coefficients SIM_BEAM_W1, SIM_BEAM_W2, . . . , SIM_BEAM_WN of FIG. 3. In the example considered, the mathematical process described above must be repeated for the calculation of beamforming coefficients of the carrier p2; in general, M procedure for each one of the M modulated carriers, generated by the SIM_RF equipment have to be made.

It is now described the dialogue method between the personal computer CNTR_PC and the simulation equipment SIM_RF, in order to better highlight the functions of the INTF_PC block of FIG. 3, missing in the mentioned known art. The above mentioned dialogue occurs through sending of messages from CNTR_PC directly towards the TX_PROC units; each message is transmitted in series with a label specifying the address of the TX_PROC addressee unit and the length of the associated message, immediately followed by the message content, that is the true data.

Making reference to FIG. 7, messages are automatically prepared by the processor CNTR_PC, after the testing operator has filled in a limited number of predetermined tables TAB.1, TAB.2, . . . , TAB.K, which summarize the general data describing the scenario to simulate. The selection of data to enter can determine the opening of submenus containing the parameters to select for the option specified. The tabular display of SIM_RF setting data is made through windows selectable on the screen and connected among them, meaning that the modification of one or more data will affect in real time all the windows involved in said data. Clicking with the mouse, the operator opens a list of possible selectable values, for each case of the table. The operator can retrieve the tables at any moment during the testing and the possible updatings are operational in real time.

For a better comprehension of the fields given in tables of FIG. 7, of those that shall be included in subsequent subtables of the relevant submenus, and of those of additional tables which will clarify the content of the messages correspondingly generated, it is helpful to give just from now some brief preliminary notions on the fundamental aspects that define the radio Um interface of the system GSM, 900 MHz, to which the testing system and the device to be tested of the example shown in FIG. 1, make explicit reference. From these notions some operation specifications for the testing system of FIG. 1 will derive. As it results from the recommendations on this purpose:

each BTS employs one or more radio carriers, each one allocated in the 900 MHz band (TX BTS: 925–960 MHz; TX MS: 880–915 MHz);

a carrier BCCH (broadcast carrier) for the transmission, is associated to each cell, diffused to all the mobiles, of the cell characteristic information;

each radio carrier is time divided in time slots of about 577 $\mu$s each, the transmission takes place in digital way with bit duration of about 3.6 $\mu$s;

each time slot contains a Normal Burst of 148 bit, or an Access Burst of 88 bit;

each Normal Burst contains a 26 bit synchronization sequence (Training sequence or middambolo), temporally positioned at the burst centre;

the repetitivity of the time slot occurs at frame interval of about 4.61 ms, for 8 time slot frames (TS0 . . . TS7);

26 sequential frames are organized in a 120 ms multiframe; 51 sequential multiframes are organized in a 6,12 second superframe; 2048 sequential superframes are organized within an iperframe of approximately three hours and a half; such a subdivision is useful to synchronise events requiring long real times to be acquired and processed;

the power emitted by the BTS on each time slot of each radio carrier has a level (Emission Level) depending on the distance separating BTS from MS (said distance is evaluated on the basis of the TIMING ADVANCE parameter), and level and quality of the signal received.

From the above mentioned specifications it can be noticed that up to now, recommendations concerning the behaviour of the intelligent antenna do not exist.

The BTS controls the radio interface monitoring the following parameters (updated every 480 ms):

distance of MS from BTS, proportional to the radio signal propagation time (parameter: TIMING ADVANCE);

level of the signal received, depending on the attenuation of radio length separating MS from BTS, within the coverage along a specified direction (parameter: RX_LEV);

useful/interferent ratio C/I, depending on the above mentioned considerations and essentially deriving from the concept of radio resources reutilization (RX_QUAL parameter).

Based on the general notions mentioned above, some operation specifications result for the testing system of FIG. 1 that, as it is remembered, consists of the simulation equipment SIM_RF connected to its own control processor CNTR_PC through a serial bus ET_LAN of a local network. The above mentioned specifications are given below:

| | |
|---|---|
| standard of the radio interface | EGSM900 |
| subdivision in 10 MHz sub-bands TX | 875–885 MHz |
| (because a wide band digital transmitter | 885–895 MHz |
| able to cover the whole band cannot be | 895–905 MHz |
| realized up to now) | 905–915 MHz |

-continued

| | |
|---|---|
| Power rated level TX for carrier | −13 dBm at the output of each WB_TX |
| digital control TX power level (for channel) | 15 steps, 1 dB each |
| Number of antenna elements TX | N = 8 |
| Maximum number of RF carriers | M = 16 |
| No. of time slots actually assigned | Set possibility for each carrier |
| simulation of movement for each RF carrier | Speed setting possible (3 ÷ 250 km/h) |
| relative delays between RF carriers | programmable with 1 bit GSM resolution (156 bit max) |
| relative delays between echoes of the same carrier | programmable with 50 ns resolution (3.6 µs max) |
| simulation of angular direction (for each RF carrier) | programmable on 360° with 1° resolution |

Going back now to the general tables of FIG. 7, we can notice that a given number K is foreseen (only two of them are described in detail) each one referred to a subsequent GSM frame having 4.61 ms duration. This strategy enables to gradually vary the parameters of the simulated scenario, going close to what occurs in the dynamics of a real scenario. In fact, it is known that the algorithms used by a BTS to acquire the main merit parameters of the receiver require times longer than that of a single frame. Furthermore, in the case of receiver for intelligent antenna, like that of block DUT of FIG. 1, the same works with adaptive algorithms performing their function at best on several subsequent frames. La sequence of K tables is cyclically repeated to enable a continuous operation of the testing system. The cyclic repetition of tests enables the results of the measures to reach a permanent steady condition after each manual updating of one or more parameters of the scenario, and demonstrates to be useful for a statistical evaluation of results. The transformation methods of the information included in tables of FIG. 7 in messages for the SIM_RF equipment shall be described hereafter.

The items indicated in the different cases of the general tables of FIG. 7 are self-explanatory and do not require additional comments. Concerning the connection of the general tables to submenus, the choice "FREQUENCY HOPPING: YES" determines the opening of a submenu with the following parameters to set:

| PARAMETER | IDENTIFICATION | RANGE |
|---|---|---|
| N° channels RF available | N | 1 ... 50 |
| N° selected hopping sequence | HSN | 0 ... 63 |
| offset of the allocation index of MS | MAIO | 0 ... N-1 |

The option "FADING: NO" does not determine opening of any submenu.

The option "FADING: YES" determines the opening of a submenu for the selection of one of the following known propagation models:

| PROPAGATION MODEL | IDENTIFICATION |
|---|---|
| rural area | RAx (6 taps) |
| hilly terrain | HTx (12 taps) |
| reduced hilly terrain | HTx (6 taps) |
| urban area | TUx (12 taps) |
| reduced urban area | TUx (6 taps) |
| equalization test | EQx (6 taps) |
| arbitrary | CUSTOM |

The selection of any propagation model (excluding CUSTOM) imposes the values of "RF level", "delay" and "Doppler spectrum type" of the table of FIG. 7, which determined this choice. Access to the columns of the above mentioned table is therefore inhibited to the operator, and the values automatically included in these columns are those defined by specifications GSM 05.05 Annex C (Propagation conditions). Furthermore, rural area models, reduced hilly terrain, reduced urban area, equalization test automatically engage 6 carriers of SIM_RF; the hilly terrain, urban area models automatically engage 12 carriers of SIM_RF. The selection of the discretionary model (CUSTOM) determines the enabling of the columns "delay" and "Doppler spectrum type" and the engagement of one sole RF carrier, since the selection of the number and characteristics of possible echoes and of the possible (taps) of the model itself is up to the operator.

Once the tables of FIG. 7 are filled in with the data for the simulation, guided in this by the relevant submenus, the processor CNTR_PC generates the messages instructing the processor modules TX_PROC1, TX_PROC2, . . . , TX_PROCM and the block LO_CORP.

The following table lists the identification names of messages and the relevant addressee units:

| TYPE OF MESSAGE | Bit No. | PC→ TX_PROC | PC→ LO_CORP |
|---|---|---|---|
| SIM_NCO (1 ... 16) | 8 | x | |
| SIM_D (1 ... 16) | 116 | x | |
| SIM_BEAM Wn (1 ... 16) | 256 | x | |
| SIM_DEL (1 ... 16) | 16 | x | |
| BT_SIM | 8 | x | |
| P_SYNT_SIM | 8 | | x |
| TSN | 8 | x | |

All the messages having suffix (1 . . . 16) are intended as separate messages sent to the TX_PROCm module relevant to the carrier m-th (m 1 to 16). Concerning the SIM_BEAM_Wn messages, the suffix n varies from 1 to N=8 coinciding with a generic value m to indicate N separate messages sent to the same module TX_PROCm.

The following table gives the meaning of the messages listed in the previous table:

| NAME | Bit No. | MEANING |
|---|---|---|
| SIM_NCO | 16 | Programming of the RF channel transmitted in uplink |
| SIM_D | 116 | data to be transmitted in uplink (modulating signal) |
| SIM_BEAM_Wn | 256 | Module and phase of beamforming coefficients |
| SIM_DEL | 16 | delay of the simulated carrier in uplink |
| BT_SIM | 8 | training sequence code, TSC (3 bit) + selection between NORMAL or ACCESS burst (1 bit) |
| P_SYNT_SIM | 256 | programming of LO_CORP for the selection of the carrier in the assigned time slot |
| TSN | 8 | number of the time slot of the GSM frame (TSN = 0 . . . 7) |

The necessary procedures to process data supplied by the user and to obtain the information message in the serial format accepted by the network ET_LAN and by interface blocks INTF_PC of the simulation equipment SIM_RF are developed on CNTR_PC. Following is the list of the above mentioned procedures, specifying the procedure input information (inputs) and the information supplied by the procedure itself (outputs). The inputs are the parameters selected by the user and entered through menu and submenus. The outputs contain the messages transferred by CNTR_PC, via bus ET_LAN, to modules TX_PROC and LO_CORP.

The procedures performed by CNTR_PC for the generation of the above mentioned messages are the following:
frequency hopping algorithm (see spec. GSM 05.03)
inputs: N,HSN,MAIO⇒outputs: RF channel number;
beamforming algorithm (see the previous representation of FIGS. 4, 5 and 6)
inputs: arrival angle⇒outputs: beamforming coefficients;
RF scenario simulation (see spec. GSM 05.05 Annex C, propagation condition)
inputs: standard propagation model, MS speed⇒outputs: sequence of amplitude multiplication coefficients (one per frame); relative delays between echoes of the same carrier.

Making reference to FIG. 3, we can notice that a great part of the content of messages transferred by CNTR_PC, via ET_LAN, to the interface circuit INTF_PC, are in their turn transferred to using devices. This occurs for the contents of the messages SIM_D, TSN and SIM_DEL, transferred to modulators GMSK; for the contents of the messages SIM_BEAM_Wn, transferred to first multipliers M1, M2, . . . , MN; and for the content of the message SIM_NCO, transferred to the second multipliers MM1, MM2, . . . , MMN.

The contents of all the messages are updated by CNTR_PC at each 4.61 ms GSM frame, and sent according to the same intervals to the concerned units placed in local network, even if the content of a message is unchanged compared to that of the preceding frame. Consequently the concerned modules TX_PROC and LO_CORP, can process in a frame time the updated contents of the relevant messages, in order to be able to change in real time the simulated magnitudes relevant to the modulated carriers sent to the DUT block of FIG. 1 in the subsequent frame.

The updating of the message content made by CNTR_PC of FIG. 1 at each frame, in absence of modifications introduced by the testing operator in the contents of the sequence of K tables of FIG. 7, and of subtables associated to the same, shall be that imposed by said sequence. On the contrary, in presence of modifications, it will reflect that of the updated sequence, starting from the point in the recurrent cycle in which the same is rendered operative. For a better understanding of the updating dynamics of messages generated by CNTR_PC, it is appropriate to underline that the compilation of the sequence of K tables of FIG. 7 is completely made out of line, both concerning the first drawing up and the successive modifications. Afterwards, the testing operator confirms the new version that becomes operative in real time, meaning that from that moment on, the messages sent to the network shall be generated starting from the tables of the last version, without stopping for this reason the flow of sequential messages. We can therefore conclude that while the compilation phase is completely independent from the flow of messages, the deriving updating in the content of messages, coinciding with the sending of new messages to the network, occurs in synchronous way compared to the frame interval.

From the analysis of information included in the tables of FIG. 7 and relevant menus, and from the typology of the deriving messages, we can deduce that availing, in whole, or in part, of the M=16 groups of carriers relevant to a same time slot, each group including N=8 replicas can be arbitrarily simulated:
one or more useful signals;
one or more isofrequential interferent signals (that in a real scenario are due to reutilization of the carriers in adjacent clusters) coming from directions separate from that of the relevant useful;
one or more echoes of a useful, and/or interferent signal, (that in a real scenario are generated by multiple paths) coming from directions different from that of the useful and/or interferent;
one or more interferents from adjacent channel, and relevant echoes; and also the fading effect on each one of the above mentioned signals, in non-correlated mode compared to the other signals, through multiplication of beamforming coefficients by a duly filtered pseudo-noise sequence. The operations concerning this point are directly performed by CNTR_PC through pre-processing.

The testing system of FIG. 1 is very flexible as for the panorama of possible scenarios to simulate, and easy to handle for the testing operator, whose task is limited to the entering of data in the general tables of FIG. 7. These advantages derive from the essentially digital architecture of the simulation equipment SIM_RF, which can construct N broad band digital signals at intermediate frequency IF1, . . . , IFN, of the multicarrier type. Each carrier included in the broad band signals IF1, . . . , IFN is characterized by a relevant content of the SIM_NCO message, which established the relevant intermediate frequency; therefore the simulation of several isofrequential interferents engages several modules TX_PROC to which SIM_NCO messages having identical content are sent.

Generalizations

The simulation system of the example lends itself to some generalizations that configure the invention applicable to other mobile radio systems with system setting different from the FDMA/TDMA one. For instance, as far as the invention is concerned, the TDMA aspect is not strictly necessary and, strictly speaking, also the FDMA aspect can be not considered, since for the simulation of a minimum, but realistic scenario, one sole carrier is sufficient with its isofrequential interferents. As for the invention, if we want to leave out of consideration the FDMA/TDMA architecture of the embodiment, we must be considered the dynamic characteristic of the simulated scenario which up to now was given by the updating of the significant parameters of the same at 4.61 ms interval of the GSM frame. This time slot is a good compromise between the need to avail of a processing time sufficient to the generation of configuration messages of the scenario, to their transfer on local network, and to the programming of the addressee units of the content of the same, and that to be able to simulate a realistic time slot in which the variations indicated by the succession of parameters, correspond to a same variation of the same magnitudes, but referred to phenomena which in the real context comprise the involved carriers.

From the above we can conclude that it is possible to employ the present invention to simulate the radiofrequency scenario in the testing of a base transceiver station of a cellular telephone system of the analogue type with FDMA philosophy, for instance TACS. In this case, whenever the processing times enable it, it is possible to update the scenario parameters with interval lower than 4.61 ms of the example, reaching a finer accuracy in the dynamic simulation.

From what said up to now we can conclude that, without departing from the field of the invention, the same can have further applications, in addition to those foreseen for cellular telephone systems. For instance, it is possible to use the invention in all the cases where it is necessary to test receivers for intelligent array antennas employing beamforming algorithms, but leaving out of consideration the basic philosophy of all the mobile radio telephone systems, and therefore the fact that all the interferents are caused by the reutilization of the same carriers in a territory subdivided in cells of adjacent clusters.

Possible applications of the invention in this way could be forecast in the satellite sector. Other possible applications of the invention in sectors different from the mobile radio telecommunication one, could be predicted in the radar sector.

What is claimed is:

1. Simulation process of a radiofrequency scenario starting from generation of serial messages including information for obtaining a phase-modulated radiofrequency test signal comprehensive of channel impairments, including co-channel interference, which is sent to the input of a receiver under test whose output is monitored, the process comprising:

executing N×P digital modulation of a base band carrier, for obtaining P groups of N base band isofrequential digital replicas of said phase-modulated carrier, P being chosen from 1 to a maximum number M of modulated carriers fitting an assigned band of the receiver under test, and N being a number of independent inputs of said receiver;

digitally multiplying, for every P groups of N replicas, each base band replica by a respective complex constant assigned to the group, the numerical order of the replicas and the phases of the multiplicative constants both increasing gradually in successive products, for beamforming each of the P groups of N replicas according to a desired arrival direction of the P groups for simulation;

adjusting the power level of each of the P groups of N replicas;

digitally multiplying each beamformed group of N replicas by a relevant digital intermediate frequency carrier which carries out frequency conversion of the group at a respective intermediate frequency, thereby establishing for each intermediate frequency converted beamformed group a relative position inside the broad band of the receiver under test;

summing the P intermediate frequency converted replicas having the same order in each beamformed group, for obtaining N broad band intermediate frequency replicas;

executing analogue conversion of the N broad band intermediate frequency replicas and filtering broad band the analogue replicas for reconstruction;

executing radiofrequency conversion, amplification and filtering of the reconstructed analogue replicas for obtaining N broad band radiofrequency replicas constituting a single test signal suitable for testing the operation of a directional receiver;

application of the N broad band radiofrequency replicas directly to N radiofrequency inputs of the receiver under test, each radiofrequency input bypassing an associated antenna.

2. Simulation process of radiofrequency scenario according to claim 1, wherein the content of said serial messages is read from general tables of parameters and options defining a scenario concerning at least one useful transmission signal and one or more isofrequential interferent signals, having simulated arrival directions generally different from those of said relevant useful signals.

3. Simulation process according to claim 2, wherein said general tables constitute a sequence of K tables cyclically read.

4. Simulation process according to claim 3, wherein operative phases of the simulation process form a sequence repeated at time intervals of the same duration, intermittently using said messages obtained converting a new general table of said cyclic sequence, thus giving dynamic and recurrent characteristics to said simulated scenario.

5. Simulation process according to claim 4, wherein said equal duration of the time intervals is such that a variation speed of the contents of said messages is similar to the one that can be detected in the corresponding said parameters of a real scenario.

6. Simulation process according to claim 5, wherein said duration is equal to, or lower than 4.61 ms.

7. Simulation process according to claim 4, wherein said general tables are updated during the testing time, and corresponding updated messages are generated in synchronous mode compared to said sequential time intervals.

8. Simulation process according to claim 4, further comprising an additional acquisition phase of the results of said testing, in asynchronous mode compared to said sequential time intervals.

9. Simulation process according to claim 2, wherein selection of some of said options of said general tables involves the compilation of relevant sub-tables containing additional parameters to select for the selected options.

10. Simulation process according to claim 4, wherein said carriers are time division multiplexed, and each of said sequential time intervals of the same duration corresponds to a frame time.

11. Simulation process according to claim 2, wherein said general tables also include parameters that take into account the presence of noise, a doppler effect due to the speed of mobiles, and the quick and sudden fading of a received electromagnetic field, caused by multiple paths destructive interference or by masking by obstacles encountered by mobiles in movement.

12. Testing system of a radiofrequency receiver, including a control processor for generating serial messages directed to orthogonal modulation and frequency conversion devices controlled by the content of said messages for generating a phase-modulated radiofrequency test signal comprehensive of channel impairments, including co-channel interference which is sent to a receiver under test whose output is monitored, the testing system comprising:

N×P digital modulators of a self-generated base band carrier, for obtaining P groups of N base band isofrequential digital replicas of said phase-modulated carrier, P being chosen from 1 to a maximum number M of modulated carriers fitting an assigned band of the receiver under test (DUT), and N being a number of independent inputs of said receiver;

N×P first digital multipliers arranged for multiplying, for every P groups of N replicas, each base band replica by a respective complex constant assigned to the group, the numerical order of the replicas and the phases of the multiplicative constants both increasing gradually in successive products, for beamforming each of the P group of N replicas according to a desired arrival direction of the P groups for simulation;

means for adjusting a power level of each of the P groups of N replicas;

N×P second digital multipliers for multiplying each beamformed group of N replicas by a relevant digital intermediate frequency carrier which carries out frequency conversion of the group at a respective intermediate frequency, so establishing for each intermediate frequency converted beamformed group a relative position inside the broad band of the receiver under test;

N digital adding means for summing up all the P intermediate frequency converted replicas having the same order in each beamformed group, for obtaining N broad band intermediate frequency replicas;

N digital/analogue conversion means of said N broad band intermediate frequency replicas followed by broad band filtering means for reconstructing the analogue replicas;

N radiofrequency mixers of said N broad band reconstructed analogue replicas for obtaining N broad band radiofrequency replicas;

N radiofrequency amplifiers for amplifying said radiofrequency replicas and orderly sending said amplified radiofrequency replicas to N radiofrequency outputs of the testing system, where the radiofrequency replicas constitute a single test signal suitable for testing the operation of a directional receiver;

a whole of N coaxial cables, or equivalent means, connecting said N radiofrequency outputs to a same number of inputs of said receiver, without antenna.

13. Testing system according to claim 12, wherein the intermediate frequency converted beamformed groups, each of N replicas, are generated by means of P identical digital modules, each including a dedicated processor interface communicating with N digital modulators, N first digital multipliers, and N second digital multipliers; the whole digital modules being connected to N buses for transferring the N broad band intermediate frequency replicas towards as many digital to analogue converters, through a binary tree of N two-inputs digital adders.

14. Testing system according to claim 12, wherein said control processor transfers to interface means said control messages at sequential time intervals of identical duration.

15. Testing system according to claim 14, wherein said identical duration of the sequential time intervals is such that a variation speed of the contents of said messages is similar to that which can be detected in corresponding parameters of a real scenario.

16. Testing system according to claim 12, wherein said messages are obtained from the conversion of general tables of parameters and options defining a simulated scenario, stored into said control processor.

17. Testing system according to claim 16, wherein said general tables are organized in a sequence of K tables cyclically repeated.

18. Testing system according to claim 14, wherein said duration is equal to or lower than 4.61 ms.

19. Testing system according to claim 16, wherein said general tables are filled in before the testing and updated during the testing, and the corresponding updated messages are generated in synchronous mode compared to said sequential time intervals.

20. Testing system according to claim 14, wherein said carriers are time division multiplexed and said duration corresponds to a frame time.

21. Testing system according to claim 16, wherein said general tables include also parameters to simulate the presence of noise, a doppler effect due to the speed of mobiles, and the quick and sudden fadings of a received electromagnetic field, caused by destructive interference by multiple paths or by masking by obstacles encountered by the mobiles in movement.

* * * * *